US008153943B2

(12) United States Patent
Nelson

(10) Patent No.: US 8,153,943 B2
(45) Date of Patent: Apr. 10, 2012

(54) TORNADO DETECTION NETWORK

(76) Inventor: Riley H. Nelson, Orlando, FL (US)

( * ) Notice: Subject to any disclaimer, the term of this patent is extended or adjusted under 35 U.S.C. 154(b) by 0 days.

(21) Appl. No.: 12/497,840

(22) Filed: Jul. 6, 2009

(65) Prior Publication Data

US 2010/0001118 A1    Jan. 7, 2010

Related U.S. Application Data

(60) Provisional application No. 61/077,933, filed on Jul. 3, 2008.

(51) Int. Cl.
F41G 7/22 (2006.01)
F42B 15/01 (2006.01)
F41G 7/00 (2006.01)
F42B 15/00 (2006.01)
G01S 13/95 (2006.01)

(52) U.S. Cl. ...... 244/3.19; 244/3.1; 244/3.15; 342/26 R; 342/60; 342/61; 342/62; 342/118; 342/120; 342/175; 342/195; 702/1; 702/2; 702/3

(58) Field of Classification Search ............ 244/3.1–3.3, 244/117 R, 136, 129.1, 130, 34 R, 35 R, 244/198, 201–219; 89/1.11, 1.1; 342/26 R–26 D, 342/61–68, 175, 195, 59, 60, 118, 120–122; 102/363; 361/212; 239/1, 2.1, 14.1; 52/79.1, 52/79.4, 169.1, 169.6; 454/339, 340; 340/500, 340/540, 601; 702/1, 2, 3
See application file for complete search history.

(56) References Cited

U.S. PATENT DOCUMENTS

| | | | | | |
|---|---|---|---|---|---|
| 370,845 | A | * | 10/1887 | atwater | 89/1.1 |
| 2,550,324 | A | * | 4/1951 | Brandau | 239/2.1 |
| 3,407,733 | A | * | 10/1968 | Copas | 239/14.1 |
| 3,534,906 | A | * | 10/1970 | Gensler | 239/2.1 |
| 4,362,280 | A | * | 12/1982 | McCambridge | 239/14.1 |
| 5,354,017 | A | * | 10/1994 | Levich | 244/204 |
| 5,551,916 | A | * | 9/1996 | Morse, Jr. | 454/340 |
| 5,979,128 | A | * | 11/1999 | Parsons | 52/169.6 |
| 6,034,608 | A | * | 3/2000 | Frank et al. | 702/3 |
| 6,097,296 | A | * | 8/2000 | Garza et al. | 340/601 |
| 6,151,841 | A | * | 11/2000 | Green | 52/79.4 |
| 6,232,882 | B1 | * | 5/2001 | Hed et al. | 340/601 |
| 6,255,953 | B1 | * | 7/2001 | Barber | 340/601 |
| 6,295,001 | B1 | * | 9/2001 | Barber | 702/3 |
| 6,751,580 | B1 | * | 6/2004 | Cope et al. | 703/2 |
| 2002/0088364 | A1 | * | 7/2002 | Feldman | 102/363 |
| 2003/0085296 | A1 | * | 5/2003 | Waxmanski | 239/2.1 |
| 2004/0149156 | A1 | * | 8/2004 | Yi et al. | 102/363 |
| 2005/0039626 | A1 | * | 2/2005 | Yi et al. | 102/363 |
| 2008/0035750 | A1 | | 2/2008 | Aylor | 239/2.1 |

* cited by examiner

Primary Examiner — Bernarr Gregory
(74) Attorney, Agent, or Firm — Allen, Dyer, Doppelt, Milbrath & Gilchrist, P.A

(57) ABSTRACT

A tornado disarming network includes a command center, tornado detection systems, and tornado busting missile launch sites in communications with the command center. Tornado busting missiles are at the tornado busting missile launch sites. Each tornado busting missile includes a radar, a guidance system and a solid rocket motor for propelling the missile toward the tornado. A thruster control system causes the tornado busting missile to travel upward within the tornado upon reaching the tornado. An explosive discharge system explodes within the tornado to generate heat for causing the air within the tornado to expand, thereby weakening the tornado.

22 Claims, 9 Drawing Sheets

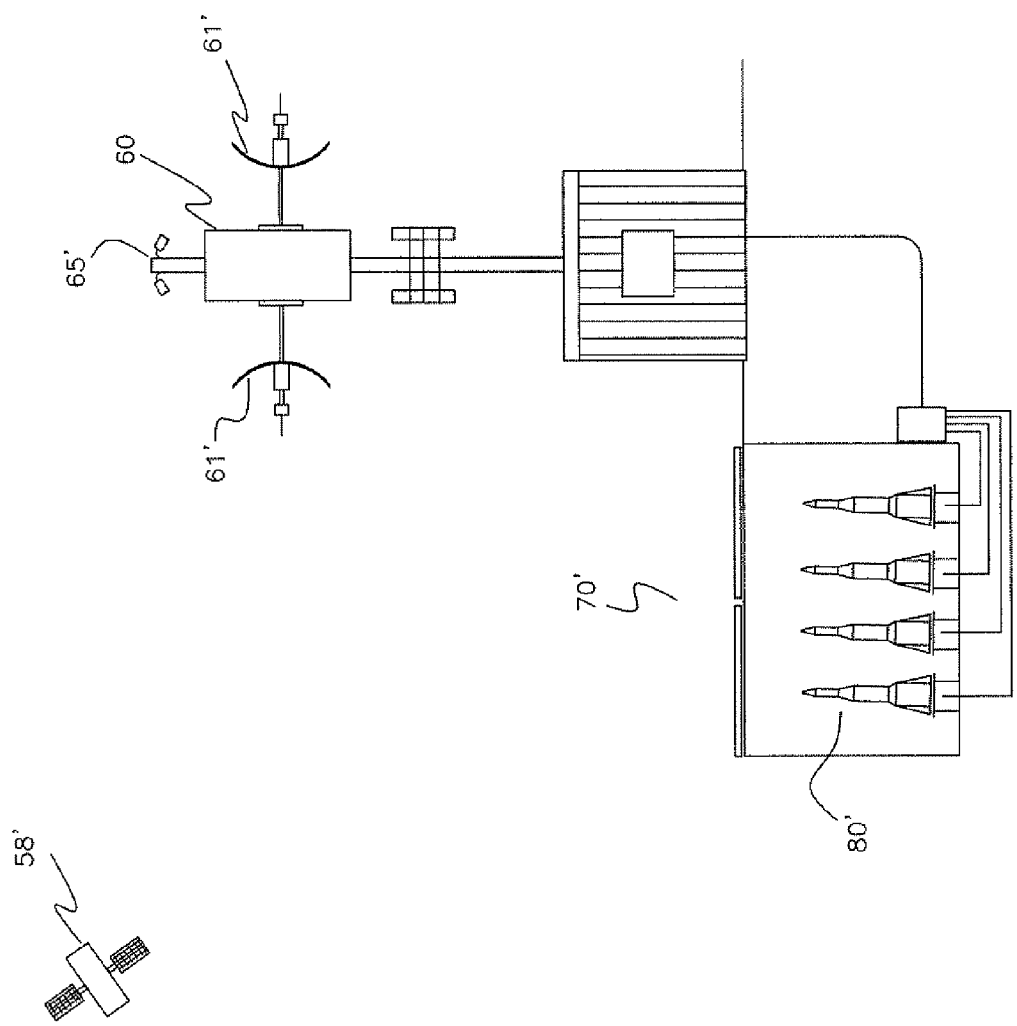

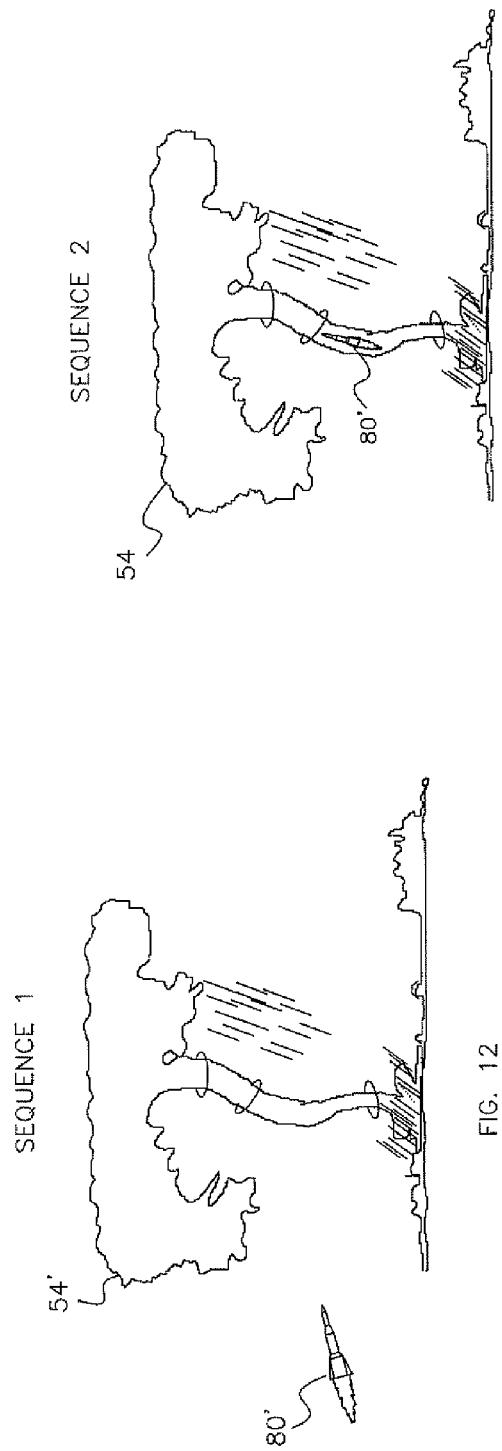
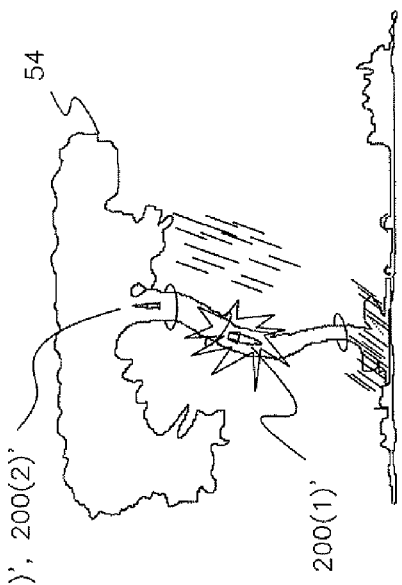

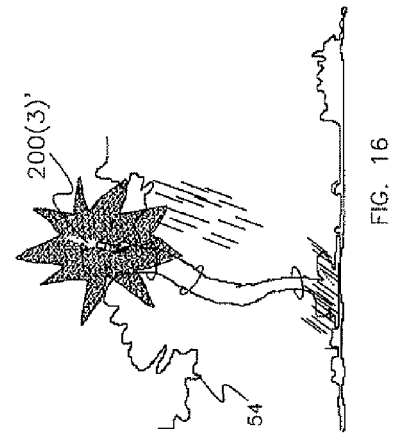
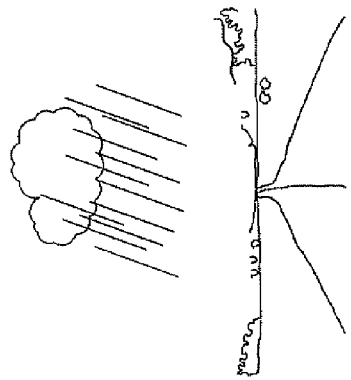
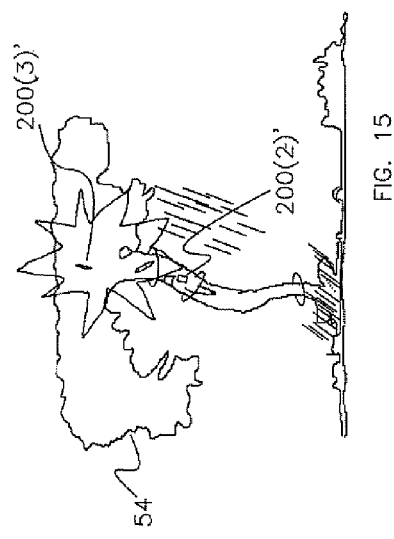
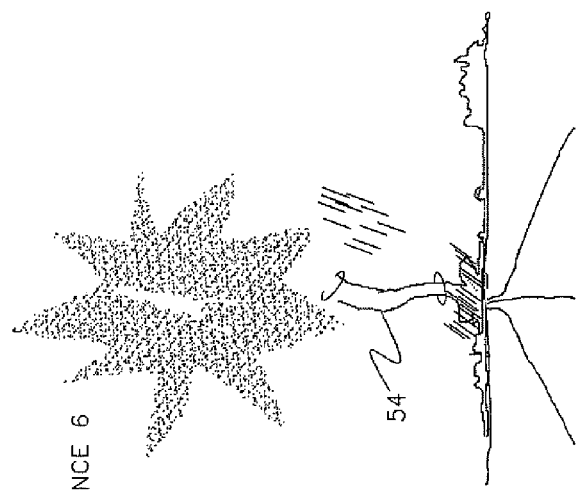

TORNADO DETECTION NETWORK

RELATED APPLICATIONS

This application claims the benefit of U.S. Provisional Application Ser. No. 61/077,933 filed Jul. 3, 2008, the entire contents of which are incorporated herein by reference

FIELD OF THE INVENTION

The present invention relates to the field of weather, and more particularly, to a tornado disarming network for disarming or reducing the destructiveness of a tornado.

BACKGROUND OF THE INVENTION

Tornados can cause considerable damage. Tornados develop from weaker vortices that "spin up" into tornados. The development of a tornado can proceed very quickly, sometimes in a matter of minutes. The force of a tornado requires a low pressure in the center of a cyclonic wind that is created by an upward flow of air. This upward flow of air is due to the air in the center at the surface being lighter as a result of being warmer and lighter than the air above.

In a cyclonic wind, the air swirls around a center thereof in a downward spiral until it reaches the bottom that is sealed by the earth, whereupon the air, having nowhere else to go, rises through the center of the cyclonic wind due to it being lighter than the air at the top of the cyclonic wind. The air that rises is replaced by air that has spun around the center on its way to the bottom of the cyclonic wind in a vortex. The vortex of air whirling around the center creates a "wind wall" separating the interior of the cyclone from the outside to maintain stability. In addition, the centrifugal force created by the swirl helps decrease the density of the air in the center, since warm air, that is lighter, preferentially remains in the center as the centrifugal force moves the heavier, colder air to the outside of the vortex.

One approach to reducing tornado wind damage is disclosed in U.S. Published Patent Application No. 2008/0035750. The damage from cyclonic winds may be reduced by disrupting the stability required to maintain the cyclonic wind. This may be accomplished by firing an explosive device directly at the cyclonic wind. For example, the explosive device may be directed by a high-flying airplane or rocket down the funnel of the tornado to stop the upward flow of air. While the use of an explosive device has been generally discussed, there is a need for a more comprehensive approach that can be applied on a larger scale.

SUMMARY OF THE INVENTION

In view of the foregoing background, it is therefore an object of the present invention to provide a tornado disarming network for disarming or reducing the destructiveness of a tornado.

This and other objects, features, and advantages in accordance with the present invention are provided by a tornado disarming network comprising a command center, a plurality of spaced apart tornado detection systems for detecting and reporting a tornado to the command center, and a plurality of spaced apart tornado busting missile launch sites in communications with the command center. A plurality of tornado busting missiles is at the plurality of spaced apart tornado busting missile launch sites to be launched toward a detected tornado.

Each tornado busting missile may comprise a housing, a radar carried by the housing for tracking the detected tornado after launch, and a guidance system carried by the housing for guiding the tornado busting missile toward the tracked tornado after launch. A solid rocket motor may be carried by the housing for propelling the tornado busting missile toward the tracked tornado. A thruster control system may be coupled to the solid rocket motor for causing the tornado busting missile to travel upward within the tornado upon reaching the tracked tornado. An explosive discharge system may be carried by the housing for exploding within the tornado to generate heat for causing the air within the tornado to expand, thereby weakening the tornado. The damage from the winds of the tornado may thus be reduced by disrupting the stability required to maintain the tornado.

Each tornado busting missile may further comprise a pressure monitoring system carried by the housing for monitoring a change in pressure within the tornado. A controller may also be carried by the housing for controlling the thruster control system based on the monitored change in pressure. The controller may initiate explosion of the explosive discharge system based on the monitored change in the pressure. The controller may determine a vortex of the tornado based on the monitored change in pressure, and initiates explosion within the vortex.

The explosive discharge system may comprise a first canister for holding a first chemical, and a second canister for holding a second chemical, and wherein the exploding is based upon mixing together the first and second chemicals. The first chemical may comprise carbon disulphide and phosphorus crystals, and the second chemical may comprise chlorine gas. The explosive discharge system may further comprise a mixer coupled between the first and second canisters for allowing the first and second chemicals to be mixed together.

The command center may provide a launch command to one of the tornado busting missile launch sites in proximity to the detected tornado. Each tornado busting missile may further comprise an altitude determining device carried by the housing for determining an altitude thereof. A transceiver may also be carried by the housing for reporting the determined altitude to the command center. The command center may generate an abort command based on the determined altitude, and provide the abort command to the transceiver.

The plurality of spaced apart tornado busting missile launch sites may comprise fixed and mobile launch sites. The mobile launch sites may be ground based and airborne.

In another embodiment, the tornado busting missiles may comprise a plurality of explosive discharge stages adjacent to the housing, where the explosive discharge stages are separable from one another based on positioning within the tornado. By having multiple stages exploding within the tornado, there is a greater chance for the tornado to be disarmed or weakened. Of course, the last stage to explode does not have to separate from the housing, which carries the electronics for the tornado busting missile. The controller carried by the may control when the explosive discharge stages are to separate and explode, which may be based on a monitored change in pressure within the tornado.

BRIEF DESCRIPTION OF THE DRAWINGS

FIG. 5 is a schematic diagram of another ground based tornado busting missile launch site for a tornado disarming network in accordance with the present invention.

FIGS. 12-18 are schematic diagrams illustrating sequences for disarming a tornado in accordance with the present invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
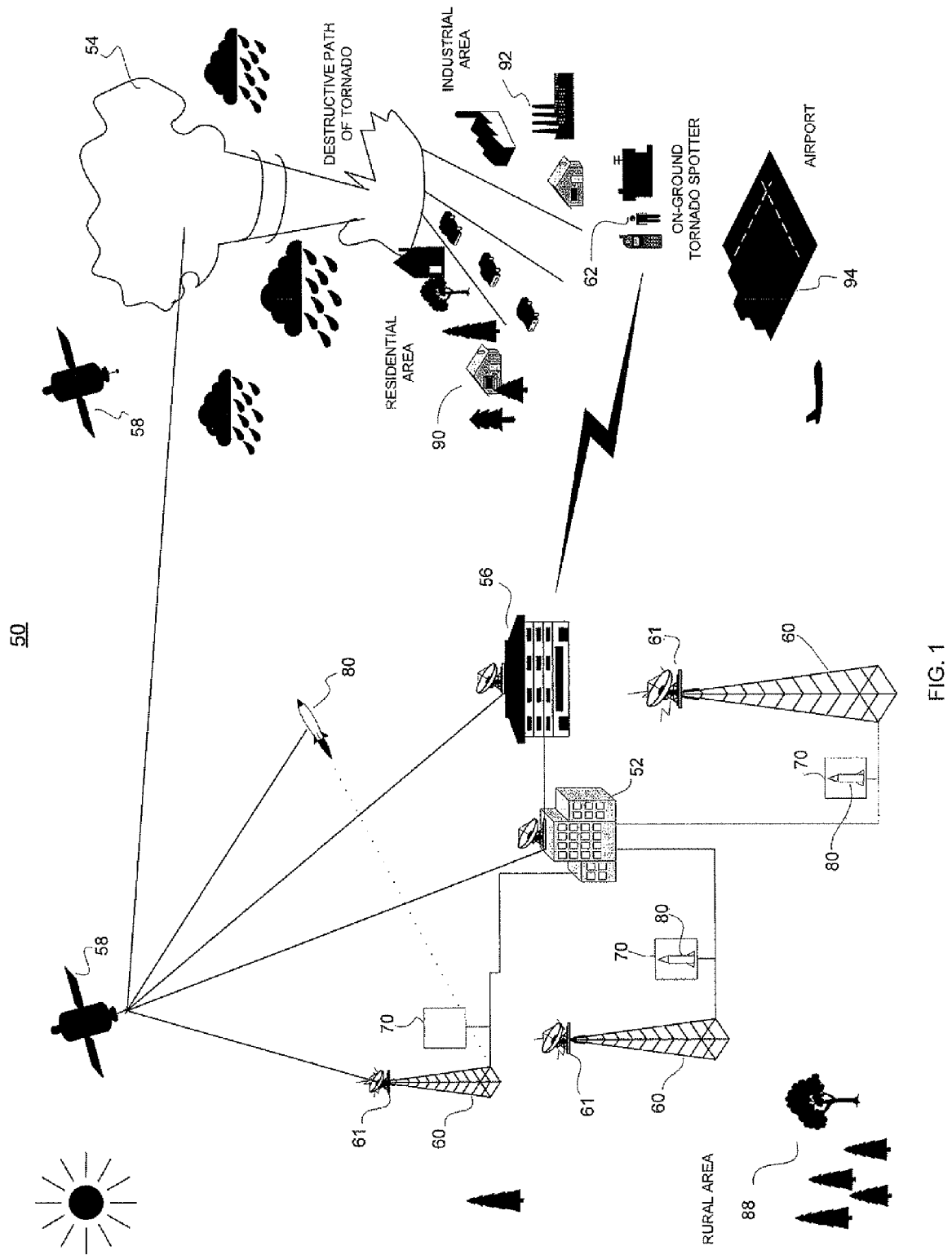
FIG. 1 is a schematic diagram of a tornado disarming network in accordance with the present invention.

Referring initially to FIG. 1, a tornado disarming network 50 comprises a command center 52, and spaced apart tornado detection systems 60 for detecting and reporting a tornado 54 to the command center. Each tornado detection system 60 comprises a radar 61, such as a Doppler radar, for example.

Spaced apart tornado busting missile launch sites 70 are in communications with the command center 52. In the illustrated example, there is a tornado busting missile launch site 70 collocated with each tornado detection system 60. Each tornado busting missile launch site 70 has one or more tornado busting missiles 80 associated therewith.

The command center 52 provides a launch command to one or more of the tornado busting missile launch sites 70 in proximity to the detected tornado. The command center 52 is also in communications with the national weather center 56 in Norman, Okla. The launch command may be provided to the launch sites 70 via a wired or wireless connection. The launch command may even be relayed via satellites, such as weather satellites 58.

In addition to tracking and reporting tornados via the tornado detection systems 60, the weather satellites 58 may also be used. Information from the weather satellites 58 may be provided directly to the command center 52 as well as to the national weather center 56. In addition, a spotter 62 on the ground may report development of a tornado 54 to the national weather center 56. Formation of a tornado 54 is unpredictable, and may easily form in a rural area 88, a residential area 90, an industrial area 92 and at an airport 94.

Figure 2:
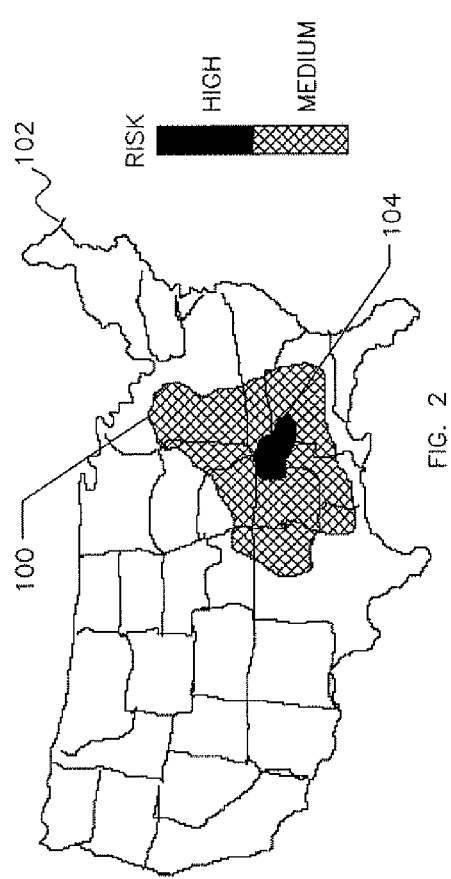
FIG. 2 is a map of the United States illustrating tornado alley in accordance with the present invention.

Location of the tornado detection systems 60 are preferably located where there is a high frequency of tornados, such as tornado alley. Tornado alley 100 covers a multi-state region, as indicated on the map 102 of the United States shown in FIG. 2. In particular, the risk of a tornado is highest for area 104 within tornado alley 100.

Figure 3:
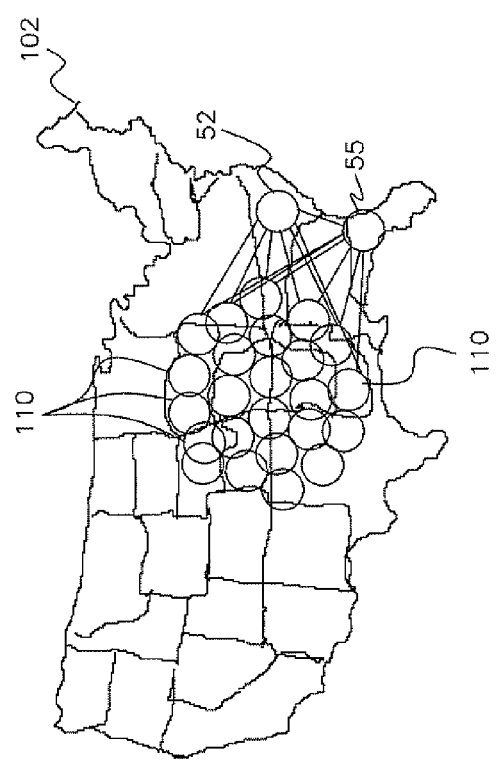
FIG. 3 is a map of the United States illustrating a network of tornado early warning sites positioned according to tornado alley shown in FIG. 2.

The tornado disarming network 50 may be divided into a plurality of early warning sites 110, as shown in FIG. 3. The early warning sites 110 are adjacent one another and may even overlap one another in certain areas to provide full coverage for tornado alley 100. Each early warning site 110 has one or more tornado detection systems 60 operating therein. The early warning sites 110 are collectively under the control of the command center 52. In case the command center 52 become non-operational, control is shifted to a backup command center 55.

Figure 4:
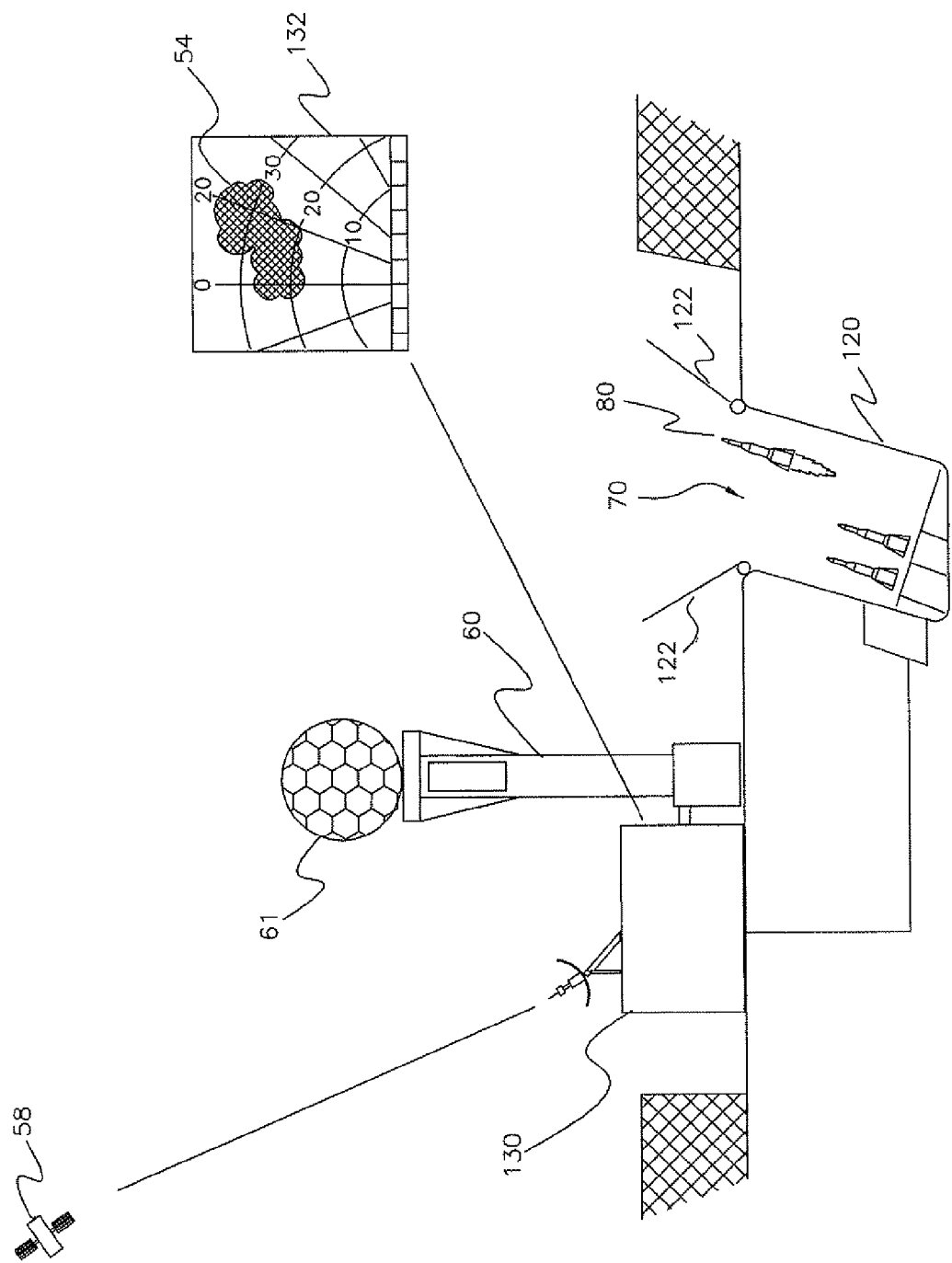
FIG. 4 is a schematic diagram of a ground based tornado busting missile launch site for a tornado disarming network in accordance with the present invention.
Figure 9:
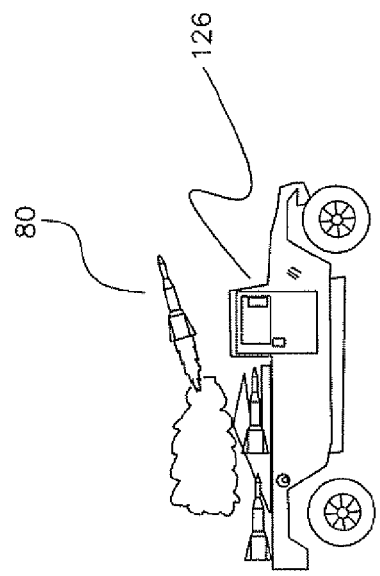
FIGS. 6-9 are schematic diagrams of mobile tornado busting missile launch sites for a tornado disarming network in accordance with the present invention.

Tornado busting missile launch sites that are ground based will now be discussed in reference to FIGS. 4 and 5. The tornado busting missiles 80 are launched from an underground storage facility 120. Hatches 122 open to allow deployment of the tornado busting missiles 80. A tornado detection system 60 is at the launch site 70 for detecting a tornado 54. In addition, a tornado monitoring and control system 130 is at the tornado busting missile launch site 70 for tracking a detected tornado 54. The tornado monitoring and control system 130 is in communications with the command center 52.

An example radar image of a detected tornado 54 is provided on display 132. This information is determined by the radar 61 associated with the tornado detection system 60, and this information may be provided to the command center 52. The information includes size, range and an actual/projected path to the detected tornado 54. The weather satellites 58 may also assist with detection and reporting of a tornado 54, tracking of the detected tornado 54, and guidance of a tornado busting missile 80 to the detected tornado.

Tornado busting missile launch sites 70' may be positioned without a tornado monitoring and control system 130 associated therewith, as shown in FIG. 5. The tornado busting missile launch site 70' is in communications with the command center 52, and is remotely controlled by the command center.

A tornado detection system 60' is at the launch site 70' and comprises one or more radars 61' for detecting a tornado 54. Each radar 61' has a dish that rotates 180 degrees at different look-up angles. As readily appreciated by those skilled in the art, each dish may be coated with electrode type devices to emit laser beams to determine range to the tornado 54. Once a tornado 54 is detected, a warning sound is emitted from a warning system 65'.

Figure 7:
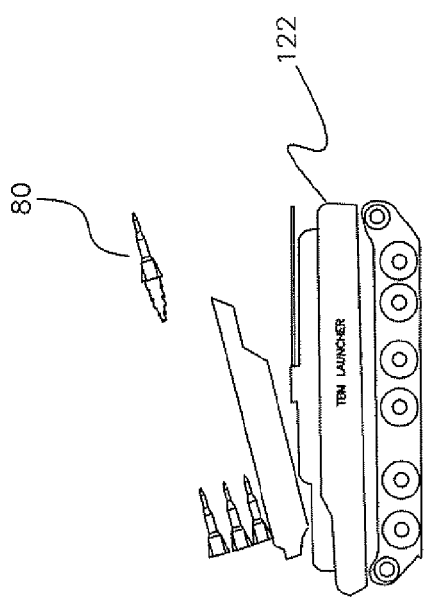
Figure 8:
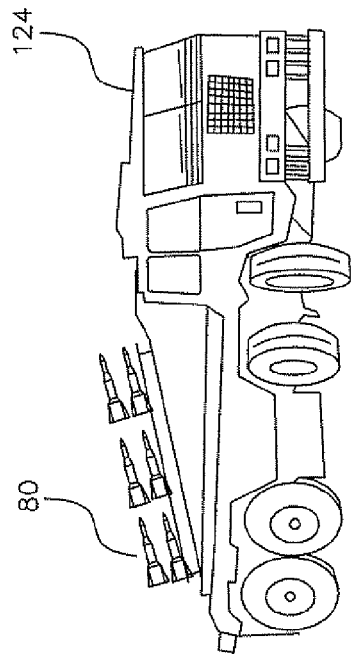
Figure 6:
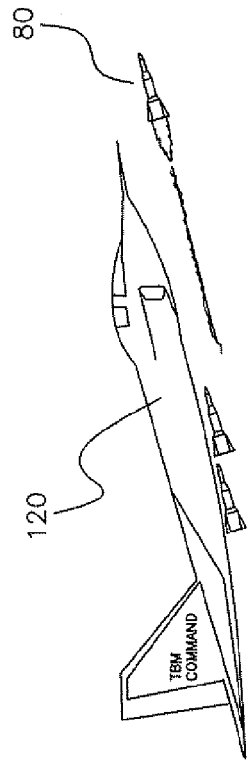

Referring now to FIGS. 6-9, mobile tornado busting missile launch sites may be used in addition to the ground based launch sites. The mobile tornado busting missile launch sites may be on the ground or in the air. A tornado busting missile 80 may be launch from an airplane 120, as shown in FIG. 6. For rough terrain, a tank-like launcher 122 may be used, as shown in FIG. 7. A large truck launcher 124 may be used to protect a small town or city in the path of an approaching tornado 54. For greater mobility, a small truck launcher 126 may also be used. Each one of these mobile launchers may be in communications with the command center 52, and/or the tornado monitoring and control system 130 associated with the respective tornado detection systems 60 supporting the mobile launchers.

Figure 10:
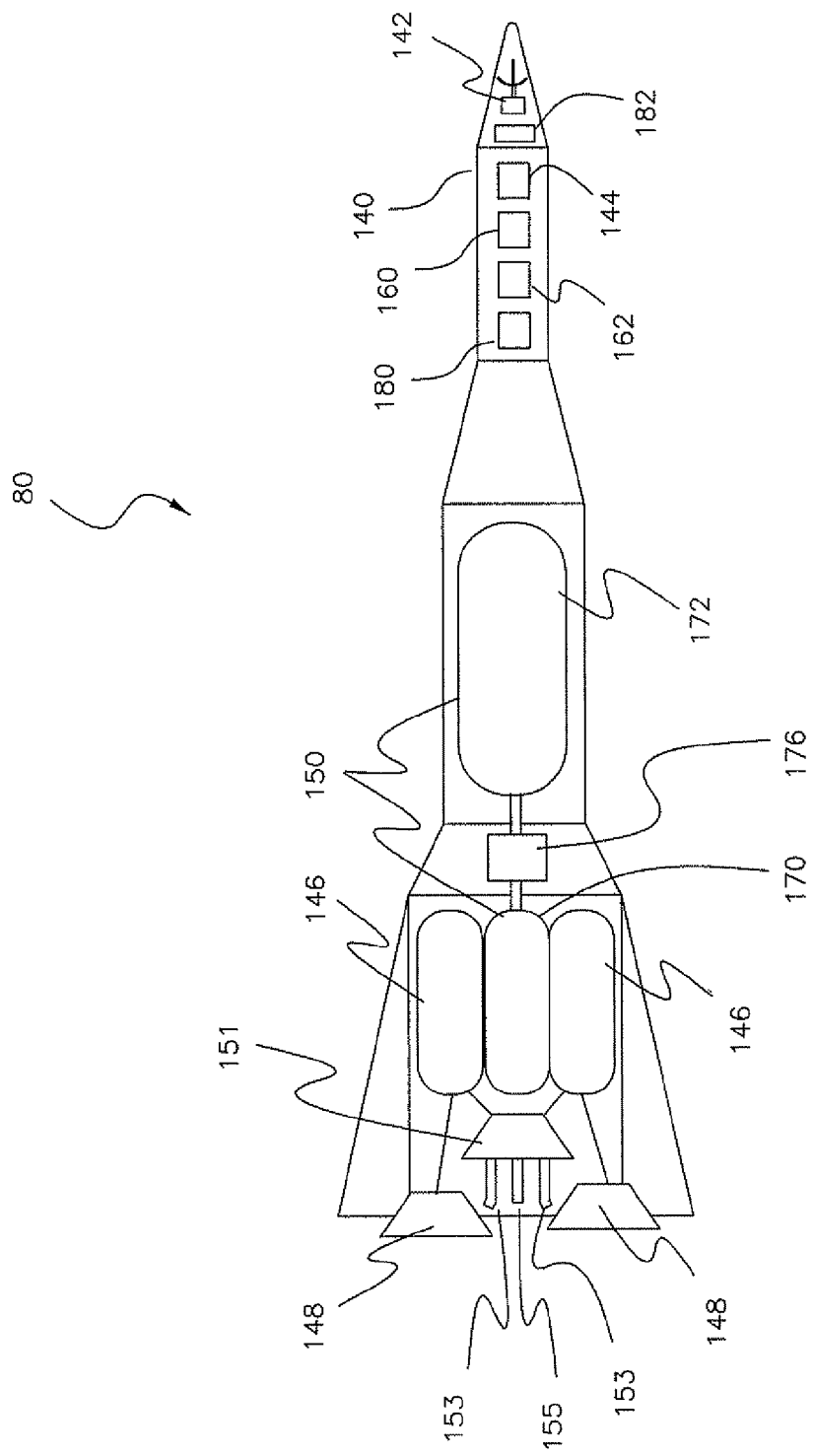
FIG. 10 is a schematic diagram of a single stage tornado busting missile for a tornado disarming network in accordance with the present invention.

A schematic diagram of a single stage tornado busting missile 80 is provided in FIG. 10. Each tornado busting missile 80 comprises a housing 140, a radar 142 carried by the housing for tracking the detected tornado 54 after launch, and a guidance system 144 carried by the housing for guiding the missile toward the tracked tornado 54 after launch.

A solid rocket motor 146 is carried by the housing 140 for propelling the tornado busting missile 80 toward the tracked tornado 54. A thruster control system 148 is coupled to the solid rocket motor for causing the tornado busting missile 80 to travel upward within the tornado upon reaching the tracked tornado.

The solid rocket motor 146 is preferably powerful enough to overcome the downward spiral force of the tornado 54 as well as gravity. As an alternative, a complementary retro-rocket device may also be provided. This retro-rocket device 151 will insure that the tornado busting missile 80 will travel upwards within the tornado 54 against the downward force of the tornado 54. The retro-rocket device 151 may operate on compressed gas, such as helium or argon, for example.

The retro-rocket device 151 may include curved gas nozzles 153 used to turn the missile 80 vertical into the tornado center of activity. Straight gas nozzles 155 are also provided to propel the missile 80 vertical along the center of activity toward the vortex of the tornado 54. The gas is stored in a compressed gas chamber within the retro-rocket device 151, and exits at a high velocity providing the force needed to overcome gravity and the downward spiral force of the tornado activity.

The gas in the retro-rocket device 151 is gradually released. Given the mass of the missile 80 M, and mass of gas released per unit time, $\Delta M$, then $M-\Delta M$ is the mass of the rocket after each segment. If 10/10 is the mass of the missile 80, then at the end of the first time $\Delta T$ interval, assume 1/10 loss of mass M, or $\Delta M=1/10M$, then $\Delta M/M=1/9$. And, $\Delta V=\Delta M/M*Ve$, where Ve is the exhaust velocity and $\Delta V=1/9$ Ve; $\Delta V=V2-V1$; $a=\Delta V/\Delta T$; and $F\Delta T=M\Delta T$. F=force, M=mass, $\Delta T$=change in time, $\Delta V$=change in velocity, and a=acceleration.

An explosive discharge system 150 is carried by the housing 140 for exploding within the tornado 54 to generate heat for causing the air within the tornado to expand, thereby weakening the tornado. The damage from the winds of the tornado may thus be reduced by disrupting the stability required to maintain the tornado. The explosive discharge system 150 is chemical based, and will be discussed in greater detail below.

Each tornado busting missile 80 further comprises a pressure monitoring system 160 carried by the housing 140 for monitoring a change in pressure within the tornado 54. A controller 162, i.e., a computer, is carried by the housing 140 for controlling the thruster control system 148 and retro-rocket device 151 based on the monitored change in pressure. A readily understood by those skilled in the art, pressure within the tornado 54 is less than pressure outside the tornado. Consequently, the pressure monitoring system 160 is able to provide pressure measurements to the controller 162 so that the missile 80 can be angled upward within the tornado once it reaches the tornado.

The controller 162 also initiates explosion of the explosive discharge system 150 based on the monitored change in the pressure. Preferably the explosion is at the vortex of the tornado 54. The controller 162 determines the vortex of the tornado 54 based on the monitored change in pressure, and preferably initiates explosion within the vortex.

The explosive discharge system 150 comprises a first canister 170 for holding a first chemical, and a second canister 172 for holding a second chemical. The exploding is based upon mixing together the first and second chemicals. For example, the first chemical comprises carbon disulphide and phosphorus crystals, and the second chemical comprises chlorine gas. The explosive discharge system 150 further comprises a mixer 176 coupled between the first and second canisters 170, 172 for allowing the first and second chemicals to be mixed together.

As an alternative to using the above described chemicals, other types of chemicals may be used and/or substituted, as readily appreciated by those skilled in the art. The chemicals will be discussed in greater detail below.

An example explosive force needed for stopping a tornado would be equivalent to about 2.5 tons of TNT, an explosive charge that can well be delivered by the explosive discharge system 150. For smaller tornados, the amount of energy would be less. For calculations of the maximum force required to disrupt the flow of air in a tornado based on 1/2 $mV^2$, reference is directed to U.S. Published Patent Application No. 2008/0035750, which is incorporated herein by reference in its entirety.

Each tornado busting missile 80 further comprises an altitude determining device 180 carried by the housing 140 for determining an altitude thereof. A transceiver 182 is also carried by the housing 140 for reporting the determined altitude to the command center 52. The command center 52 may generate an abort command based on the determined altitude, and provides the abort command to the transceiver 182. This feature is in case the missile 80 malfunctions, or a decision is simply made not to explode the missile 80 because it is to low in altitude. The abort allows the missile 80 to self-destruct or to fall back to the ground.

Figure 11:
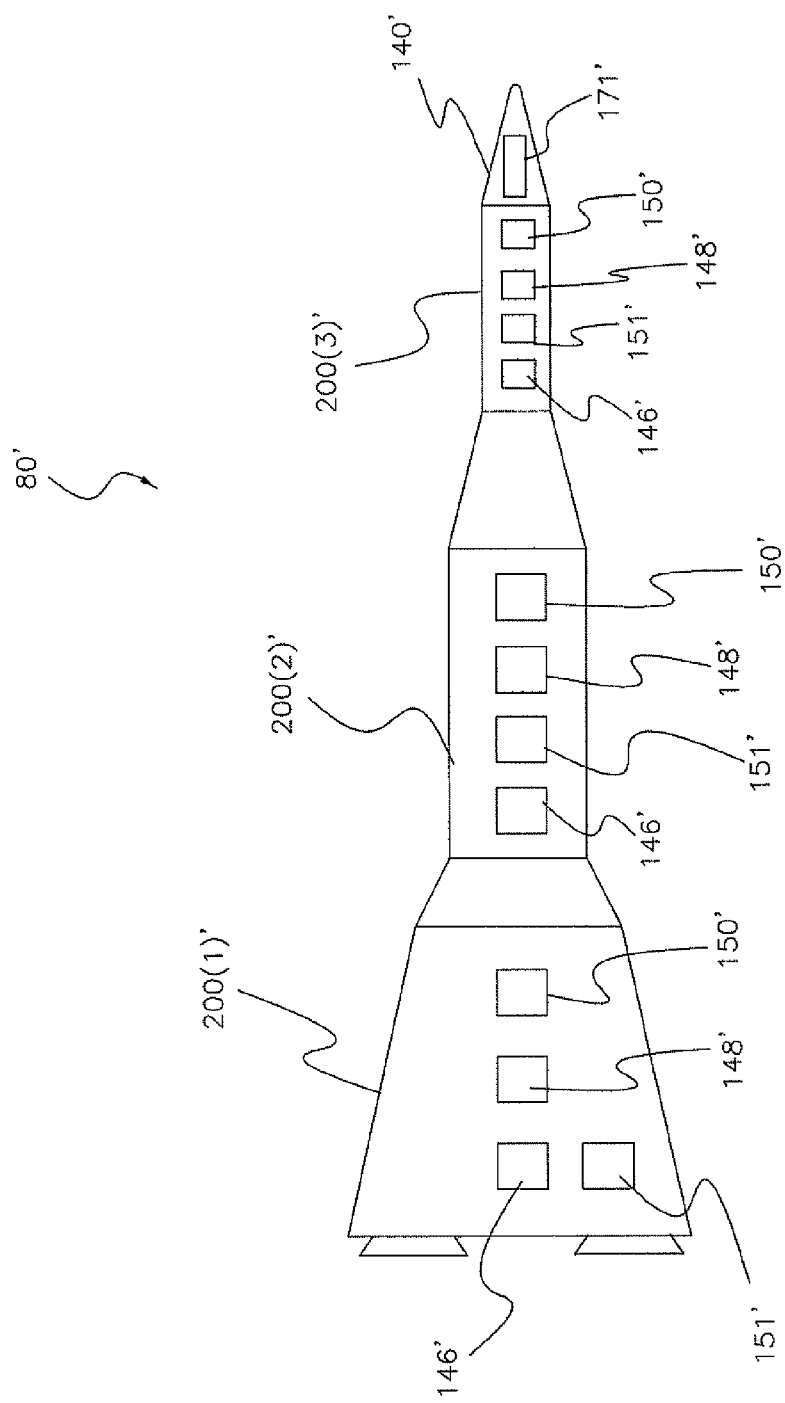
FIG. 11 is a schematic diagram of a multi-stage tornado busting missile for a tornado disarming network in accordance with the present invention.

An alternative to the single stage tornado busting missile 80 is a multi-stage tornado busting missile 80', as shown in FIG. 11. The missile 80' as illustrated includes 3 stages 200(1)'-200(3)'. Each stage 200(1)'-200(3)' in the multi-stage missile 80' is a detachable module. By having multiple stages 200(1)'-200(3)' exploding within the tornado 54, there is a greater chance for it to be disarmed or weakened. Of course the last stage 200' to explode does not have to separate from the housing 140'. The housing 140' carries the electronics, as collectively represented by 171', and as described above for the single stage missile 80.

Each stage 200(1)'-200(3)' comprises a solid rocket motor 146' for propelling the tornado busting missile 80', a thruster control system 148' for causing the tornado busting missile 80' to travel upward within the tornado, and an explosive discharge system 150' for exploding within the tornado 54 to generate heat for causing the air within the detected tornado to expand, thereby weakening the tornado. The retro-rocket device 151' is included in the first stage 200(1)', and optionally, may be included in the other stages 200(2)', 200(3)'.

The controller within the electronics 171' controls when the explosive discharge stages 200(1)'-200(3)' are to separate and explode. The pressure monitoring system 160' also within the electronics 171' monitors a change in pressure within the tornado 54, and the controller controls when the explosive discharge stages are to separate and explode based on the monitored change in pressure.

FIGS. 12-18 are schematic diagrams illustrating sequences for disarming a tornado in accordance with the present invention. In FIG. 12, a tornado 54 has been detected by a tornado detection system 60, and a multi-stage tornado busting missile 80' has been launched toward the detected tornado. At all times, the tornado busting missile 80' is under control from launch command, and if necessary, could be aborted.

Once the tornado busting missile 80' reaches the tornado 54, it travels upwards into the center of the spiral and also tracks with the direction of the tornado, as shown in FIG. 13. The upward movement of the missile as it enters the tornado 54 will be effected by a complementary retrorocket device 151. This retro-rocket device 151 will enable the missile to move against the downward force of the tornado 54.

Since the illustrated missile 80' is made of multiple stages, a first stage 200(1)' separates while the second and third stages 200(2)', 200(3)' continue traveling upwards towards the vortex of the tornado 54. After a predetermined separation interval, the first stage 200(1)' explodes, as shown in FIG. 14. This process is repeated for the second stage 200(2)', as shown in FIG. 15.

The third stage 200(3)' continues traveling upwards within the tornado 54 towards the vortex. After a predetermined separation interval, the third stage 200(3)' explodes, as shown in FIG. 16. This causes the vortex of the tornado 54 to be destroyed. The tornado collapses and is effectively disarmed of its powerful destructive forces, as shown in FIG. 17. Afterwards, the soils benefits from the phosphorus chloride produced during the explosions, as shown in FIG. 18.

A theoretical basis of the chemical explosion will now be discussed. One source for a high yield exothermic reaction is the combining of phosphorus with chlorine. The phosphorus can be extracted from calcium phosphate ($Ca_3(p0_4)z$). The calcium phosphate is heated with silicon dioxide ($SiO_z$) $Ca_3(P0_4)z+3SiO_z=3Si\sim+PzOs$. To release the phosphorus from the oxide, carbon is used: $PzOs+5C=2P+SeQ$.

The white phosphorus vapor can be separated from the carbon monoxide by passing the vaporous mixture under/through water, at room temperature. Because the phosphorus powder will ignite readily, if exposed to air, it is better kept under water. Phosphorus powder catches fire at about 45 degrees Celsius. Chemically, phosphorus reacts vigorously with chlorine, giving phosphorus chloride and heat: $2P+6CI=2PCh$, or $2P+10CI=2PCI_s+Heat$ of approximately 400,000 calories (exothermic reaction), i.e., heat, is given off.

The burning of phosphorus will now be discussed. The low ignition temperature of white phosphorus can be shown by the following experiment. Dissolve a little white phosphorus powder in carbon disulfide liquid. Hold a piece of filter paper with a pair of tongs (not with the hand, as it will cause serious burns), and dip in the mixture. Take the filter paper out of the solution and hold it till it dries; the carbon disulfide evaporates. As soon as the carbon disulfide completely dries away, leaving the white phosphorus crystals, these crystals will ignite, burning the filter paper.

Multi-stages chemical missiles will now be discussed. As displayed in the equation $4p+5O_2=2P_2O_5$, the phosphorus crystals and chlorine gas must be transported safely into the center of activity of the tornado by a suitable device. The device may be a multi-staged missile/rocket as discussed above. Each stage is designed to separate from the other stages. Each stage of the rocket may be independently guided, self-contained, and contain all the equipment.

Technology necessary to guide and discharge the chemicals (phosphorus crystals and chlorine gas) at the appropriate site and under the appropriate conditions is based on automatic settings or commands. The chemicals (phosphorus crystals and chlorine gas) contained in separate canisters, will have control valves (i.e., a mixer), allowing these chemicals to mix at the appropriate point, either by an automatic control device, or by a ground remote control device.

As the main rocket enters the area of tornado activity, the first stage will begin its deployment at that point, based on a detected demand, while the main body of the rocket, consisting of the other stages, will begin to move upwards against the downward forces of the tornado moving toward the vertex. Auxiliary retro-rockets are used to assist with the rocket to overcome gravity and downward force of the tornado.

The final stages of any single or multi-stage rocket will explode upon reaching the vertex of the tornado. Several multi-stage rockets may be used to destroy powerful tornados. These multi-stage rockets will either be stored in silos equipped with proper launching mechanisms, or mounted on small trucks equipped with proper launching mechanisms. The network is synchronized with the national weather detection system, and with weather satellites.

The tornado disarming system-mechanism will now be discussed. Tornado detection/tracking systems are set up at strategic points in states frequented by tornado activities. Observation/sensing towers are incorporated into detection/tracking towers. An alarm system is provided. Sensing/detection dishes rotate 180 degrees, at different look-up angles. The surface portion of the dish is coated with electrode-type devices to emit laser beams to detect at a given distance atmospheric pressure changes and other elemental factors (pre-tested by simulation) to indicate tornado activities at a radius of 50 to 100 miles, for example.

A discharge/trigger/propelling mechanism is synchronized with an alarm/detection/sensing device containing the phosphorus crystals and chlorine gas/carbon disulfide gas and will be launched as appropriate. Once tornado activities are detected/located, the synchronized systems of alarms/warnings, and system preparation to launch the disarming chemical multi-stage rockets are activated.

Upon entering the tornado funnel/center of tornado activity, the mechanism to cause the chemicals to mix will be ready to be triggered, thus causing the mixing and subsequent explosion(s). The heat generated by the explosion will cause the air in the tornado to expand, thereby weakening its power/impact on the area in its path: $2P+6CI=2PCh$, or $2P+lOCI=2PCI_s+Heat$ (about 400,000 Calories/Gm MoL (exothermic reaction). The phosphorus chloride formed during the explosion is actually beneficial to the soil.

Possible theories behind tornado activities will now be discussed. The most probable reason why a tornado is so devastating is its vortex-impact of the rotating column of (mainly) air and debris in the funnel-shaped downspout on the area it passes over. This high-speed rotation of the air generates tremendous power, similar to a corkscrew/or drill, pulling all things within the radius of activity towards its center of activity.

One can imagine the formation of a tornado as the process of sifting some grated substance (cassava, coconut, carrot, etc) through a piece of cheese cloth. The cheese cloth will sag, thereby allowing the filtrate to be collected in a container below. Except that the ice/dust particles formed hundreds of feet in the cumulus cloud is not sifted out. In fact, this is what forms the initial vortex, and, because this accumulation is now denser than the surrounding air, it develops tremendous speed, accelerating at 33 ft/sec/sec, toward the earth's center.

Test show that the air surrounding residential areas is less dense than the air in undeveloped surrounding areas. Regardless of what time of the year/season it is, the heat from houses will cause the surrounding air to be less dense. If this tornado activity develops over water, with the surface tension of the water being low, its tail will easily suck up some of the water and carry it to be deposited on land, in it's path. Approaching a housing development, where the air pressure is lower, and with probable differential magnetic activities, this condition then becomes a good target for the tornado activity. There may also be magnetic particles in the tornado column, enabling the creation of this vortex, and increasing its speed as it travels towards earth.

Consequently, the tornado disarming network is intended to aim and launch an environmentally beneficial chemically explosive compound into the heart of the tornado. This device is time-tested to explode in the center of activity of the tornado. This thereby decreases the concentration and air pressure by thinning out the air within the tornado, thus reducing the destructiveness of the tornado. The phosphorus released in this process is beneficial to the environment. This is based on the carbon disulphide mixture being mixed with the chlorine gas, with phosphorus chloride being formed.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A tornado detection network comprising:
   a command center;
   a plurality of spaced apart tornado detection systems for detecting and reporting a tornado to said command center;
   a plurality of spaced apart tornado missile launch sites in communications with said command center; and
   a plurality of tornado missiles at said plurality of spaced apart tornado missile launch sites to be launched toward a detected tornado, each tornado missile comprising
      a housing,
      a radar carried by said housing for tracking the detected tornado after launch,
      a guidance system carried by said housing for guiding said tornado missile toward the tracked tornado after launch,
      a solid rocket motor carried by said housing for propelling said tornado missile toward the tracked tornado,
      a thruster control system coupled to said solid rocket motor for causing said tornado missile to travel within the tornado upon reaching the tracked tornado, and
      an explosive discharge system carried by said housing for exploding within the tornado.

2. The tornado detection network according to claim 1 wherein each tornado missile further comprises:
   a pressure monitoring system carried by said housing for monitoring a change in pressure within the tornado; and
   a controller carried by said housing for controlling said thruster control system based on the monitored change in pressure.

3. The tornado detection network according to claim 2 wherein said controller initiates explosion of said explosive discharge system based on the monitored change in the pressure.

4. The tornado detection network according to claim 3 wherein said controller determines a vortex of the tornado based on the monitored change in pressure, and initiates explosion within the vortex.

5. The tornado detection network according to claim 1 wherein said command center provides a launch command to one of said tornado missile launch sites in proximity to the detected tornado.

6. The tornado detection network according to claim 1 wherein said explosive discharge system comprises a first canister for holding a first chemical, and a second canister for holding a second chemical; and wherein the exploding is based upon mixing together the first and second chemicals.

7. The tornado detection network according to claim 6 wherein the first chemical comprises carbon disulphide and phosphorus crystals, and the second chemical comprises chlorine gas.

8. The tornado detection network according to claim 6 wherein said explosive discharge system further comprises a mixer coupled between said first and second canisters for allowing the first and second chemicals to be mixed together.

9. The tornado detection network according to claim 1 wherein each tornado missile further comprises:
   an altitude determining device carried by said housing for determining an altitude thereof; and
   a transceiver carried by said housing for reporting the determined altitude to said command center.

10. The tornado detection network according to claim 9 wherein said command center generates an abort command based on the determined altitude, and provides the abort command to said transceiver.

11. The tornado detection network according to claim 1 said plurality of spaced apart tornado missile launch sites comprise fixed and mobile launch sites.

12. The tornado detection network according to claim 11 said mobile launch sites comprise at least one of ground and airborne launch sites.

13. A tornado detection network comprising:
   a command center;
   a plurality of spaced apart tornado detection systems for detecting and reporting a tornado to said command center;
   a plurality of spaced apart tornado missile launch sites in communications with said command center; and
   a plurality of tornado missiles at said plurality of spaced apart tornado missile launch sites to be launched toward a detected tornado, each tornado missile comprising
      a housing,
      a radar carried by said housing for tracking the detected tornado after launch,
      a guidance system carried by said housing for guiding said tornado missile toward the tracked tornado after launch,
      a plurality of explosive discharge stages adjacent to said housing, each explosive discharge stage being separable from one another based on positioning within the tornado, and comprising
         a solid rocket motor carried by said housing for propelling said tornado missile,
         a thruster control system for causing said tornado missile to travel within the tornado, and
         an explosive discharge system for exploding within the tornado; and
      a controller carried by said housing for controlling when said explosive discharge stages are to separate and explode.

14. The tornado detection network according to claim 13 wherein each tornado missile further comprises a pressure monitoring system carried by said housing for monitoring a change in pressure within the tornado; and wherein said controller controls when said explosive discharge stages are to separate and explode based on the monitored change in pressure.

15. The tornado detection network according to claim 13 wherein said command center provides a launch command to one of said tornado missile launch sites in proximity to the detected tornado.

16. The tornado detection network according to claim 13 wherein each explosive discharge system comprises a first canister for holding a first chemical, and a second canister for holding a second chemical; and wherein the exploding is based upon mixing together the first and second chemicals.

17. The tornado detection network according to claim 16 wherein the first chemical comprises carbon disulphide and phosphorus crystals, and the second chemical comprises chlorine gas.

18. The tornado detection network according to claim 16 wherein said explosive discharge system further comprises a mixer coupled between said first and second canisters for allowing the first and second chemicals to be mixed together.

19. The tornado detection network according to claim 13 wherein each tornado missile further comprises:
   an altitude determining device carried by said housing for determining an altitude thereof; and
   a transceiver carried by said housing for reporting the determined altitude to said command center.

20. The tornado detection network according to claim 19 wherein said command center generates an abort command based on the determined altitude, and provides the abort command to said transceiver.

21. The tornado detection network according to claim 13 said plurality of spaced apart tornado missile launch sites comprise fixed and mobile launch sites.

22. The tornado detection network according to claim 21 said mobile launch sites comprise at least one of ground and airborne launch sites.

\* \* \* \* \*